(12) United States Patent
Bucholz et al.

(10) Patent No.: US 7,046,169 B2
(45) Date of Patent: May 16, 2006

(54) SYSTEM AND METHOD OF VEHICLE SURVEILLANCE

(76) Inventors: Andrew J. Bucholz, 509 Robinson Ct., Alexandria, VA (US) 22302; Patrick D. Minix, 49 Skyhill Rd. #302, Alexandria, VA (US) 22314; Matthew D. Roberts, 1600 Prince St. #613, Alexandria, VA (US) 22314

( * ) Notice: Subject to any disclaimer, the term of this patent is extended or adjusted under 35 U.S.C. 154(b) by 0 days.

(21) Appl. No.: 11/217,002

(22) Filed: Aug. 31, 2005

(65) Prior Publication Data

US 2005/0285721 A1 Dec. 29, 2005

Related U.S. Application Data

(63) Continuation of application No. 10/409,083, filed on Apr. 9, 2003.

(51) Int. Cl.
*G08G 1/017* (2006.01)
(52) U.S. Cl. .................... 340/937; 340/933; 340/934
(58) Field of Classification Search ............... 340/933, 340/936, 937, 942, 934; 348/143, 148, 149; 382/103, 104; 702/159; 701/119
See application file for complete search history.

(56) References Cited

U.S. PATENT DOCUMENTS

| | | | |
|---|---|---|---|
| 5,568,406 A * | 10/1996 | Gerber | 702/159 |
| 5,809,161 A * | 9/1998 | Auty et al. | 382/104 |
| 6,121,898 A * | 9/2000 | Moetteli | 340/933 |

* cited by examiner

Primary Examiner—Van T. Trieu

(74) Attorney, Agent, or Firm—24IP Law Group USA, PLLC; Timothy R. DeWitt

(57) ABSTRACT

The invention relates to a system and method of conducting surveillance of stolen vehicles. Stolen vehicle information is downloaded from a database to a central server. At the central server, vehicle information is parsed to the specific requirements. Each subscribing jurisdiction downloads its area-specific stolen vehicle database to a subscriber workstation, e.g., via the Internet or an intranet. Police cars have on-board mobile surveillance points having a camera and a processor. A copy of the area-specific stolen vehicle database is loaded into each car's processor. The mobile surveillance point reads license plates of vehicles in traffic, and the processor compares the license plates to stolen plate numbers stored in the database. The processor activates a signal to alert the officer. Stationary checkpoints located in the jurisdiction have a stationary surveillance point having a camera and a processor. The surveillance system stores images and creates a database of all vehicle plates in the area. The surveillance data is downloaded to the subscriber computer. The subscriber computer has a map database. A comparison algorithm identifies stolen vehicles in the area and their direction of travel, and displays the information on an area map. The analysis if performed with a spatial analysis algorithm along with temporal analysis using police officer's experience and knowledge of the area and vehicle types (make/model/value/etc) stolen. The police officer analyzes patterns of stolen vehicles and generates suggested new locations for checkpoints, narrowing in on a possible chop shop location.

8 Claims, 3 Drawing Sheets

SYSTEM AND METHOD OF VEHICLE SURVEILLANCE

CROSS-REFERENCE TO RELATED APPLICATIONS

"The present application is a continuation of U.S. patent application Ser. No. 10/409,083, filed on Apr. 9, 2003 by inventors Andrew J. Bucholz, Patrick D. Minix and Matthew D. Roberts and claims the benefit of the filing date of that application."

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant Number 2002-90606-VA-IJ awarded by the U.S. Department of Justice, Office of Justice Programs, National Institute of Justice.

BACKGROUND OF THE INVENTION

1. Field of the Invention

The present invention relates broadly to systems and methods of surveillance, and particularly to surveillance of vehicles.

2. Description of the Related Art

According to Bureau of Justice Statistics, U.S. Department of Justice, auto theft costs the nation close to eight billion dollars per year. Even without factoring in the cost of higher insurance rates, the victim's loss of productivity, the impact on legitimate auto parts vendors, manufacturers, mechanics, and the concurrent loss of tax revenue on those services and products, motor vehicle theft is the most expensive property crime in the United States. On-going efforts to address this crime drain our law enforcement system, insurance companies, and other economic resources. Of the 1.17 million automobiles stolen nation-wide in the year 2000, only 14 percent of these crimes were closed by arrest.

Both professional and non-professional thieves commit vehicle theft. The non-professional steals for joy riding, other criminal activity, and transportation. The vehicles stolen by the non-professional thieves are often damaged and usually recovered. Task forces and routine patrol are used to catch these thieves. These methods typically require officers to remember license plates and descriptions of stolen vehicles, identify the vehicle regardless of whether it is parked or being driven, recall the information, and pursue the vehicle. An officer cannot observe every, or even the majority of vehicles he or she passes while on patrol. Additionally, the officer must address other events while on patrol and cannot devote all time and effort on patrol to looking for stolen vehicles.

The professional thief steals vehicles for shipment out of the country via ports and to deliver to chop shops for resale of total vehicles and parts. Professional thieves commit roughly thirty five percent of all auto thefts. Chop-shops are defined as the process of disassembling autos and destroying or disguising the identity of the vehicle or its parts so that it can be resold. These vehicles are rarely recovered. Not recovering vehicles leaves law enforcement at a distinct disadvantage to obtain information and evidence necessary to solve the crimes. The primary tool for gathering information is the confidential informant. Based on information supplied by informants, law enforcement runs undercover operations to catch the thieves. This tool leaves law enforcement to solve the problem mostly from a reactive state, as they must rely on time and labor-intensive detective work, obtaining informants, and the motivation for the informants.

Part of finding the professional thief involves locating chop shops, where stolen vehicles are painted, given license plates, or otherwise altered to sell the vehicle, or taken apart to sell spare parts. Thousands of vehicles may be stolen in any jurisdiction over a year's time. Moreover, a vehicle is often stolen from one part of town, taken to a chop shop in another part of town and disassembled for parts, or loaded onto a container and sent overseas. Law enforcement does not have any available tool to analyze the stolen vehicle data. More particularly, there is additionally no tool available for using stolen vehicle data to help locate chop shops.

There is little assistance available to law enforcement to make arrests in motor vehicle theft cases and subsequently deter further thefts. The absence of tools for gathering and analyzing information about stolen vehicles severely limits the ability of law enforcement to deter, decrease, or prevent this criminal activity. Moreover, currently in 2002, there are approximately 19,000 police departments in the United States. Without a uniform system of gathering and analyzing stolen vehicle information, it is difficult for police departments to work together on such cases.

Some systems have previously been proposed. The use of cameras in law enforcement is well known. Basic image processing systems are used at tollbooths and traffic lights, and to record the license plate of a speeding vehicle. However, such systems treat the observed vehicle in isolation, and do not relate the vehicle to a previous activity record. These systems further do not use a mobile camera in the pursuit of detection of criminal offenses occurring in real time. Current systems do not take a proactive approach, as they catch offenders only after a minor crime (traffic violation) has been committed. The system also has to address the needs of law enforcement; it must be fast, invisible, and utilize timely data if it is to provide any needed service.

Although the current systems and methods function well for their provided task, the devices do not provide users with a comparison to existing stolen vehicle databases. These systems and methods do not provide spatial analysis for recognizing traffic patterns of stolen vehicles. Further, these systems and methods do not provide tools for catching both the professional and non-professional thief.

SUMMARY OF THE INVENTION

The present invention has been made in view of the above circumstances and has as an object to provide a system and method of conducting surveillance of stolen vehicles. Yet another objective of the present invention is to provide a surveillance system customized to each jurisdiction. Still another objective of the present invention is to link stolen vehicle information nation-wide. A further object of the invention is to analyze the patterns associated with stolen vehicles. Yet another objective of the present invention is to gather data about stolen vehicles.

Still another objective of the present invention is to automate vehicle surveillance. Yet another objective of the present invention is to identify stolen vehicles in real time. A further objective of the present invention is to assess a high number of vehicles in the stream of traffic for legitimacy. Still another objective of the present invention is to provide an automated surveillance system capable of reading the myriad of typeface and designs found on license plates in the United States. Yet another objective of the present invention is to conduct surveillance of either moving or stationary vehicles from either a moving or stationary surveillance point.

Another objective of the present invention is to identify probable chop shop locations. Yet another objective of the present invention is to aid in analyzing traffic patterns of stolen vehicles. Still another objective of the present invention is to provide a stolen vehicle surveillance system that can be used by police departments throughout the United States.

Another objective of the present invention is to provide a surveillance tool that provides evidence of criminal activity that is admissible in a court of law.

The invention relates to a system and method of conducting surveillance of stolen vehicles. Stolen vehicle information is downloaded from U.S. Government, State, or local databases to a central server. At the central server, vehicle information is parsed to the specific packages. Each subscribing jurisdiction downloads its area-specific stolen vehicle database to a subscriber workstation, e.g., via the Internet or an intranet. Police cars have on-board mobile surveillance points having a camera and a processor. A copy of the area-specific stolen vehicle database is loaded into each car's processor. The mobile surveillance point reads license plates of vehicles in traffic, and the processor compares the license plates to stolen plate numbers stored in the database. The processor activates a signal to alert the officer. Stationary checkpoints located in the jurisdiction have a stationary surveillance point having a camera and a processor. The surveillance system stores images and creates a database of all vehicle plates in the area. The surveillance data is downloaded to the subscriber computer. The subscriber computer has a map system which compares stolen vehicle records to identify un-recovered stolen vehicles in the area and their direction of travel, and displays the information on an area map. The analysis process is a spatial analysis of similar criminal methods of operation (mo), vehicle types, values, time of day, general location. The system displays data using filters and sorting tools. The spatial analysis is done visually by the investigator over a map display. The spatial analysis generates suggested new locations for checkpoints, narrowing in on a possible chop shop location.

Additional objects and advantages of the invention will be set forth in part in the description which follows and in part will be obvious from the description, or may be learned by practice of the invention.

BRIEF DESCRIPTION OF THE DRAWINGS

The accompanying drawings, which are incorporated in and constitute a part of this specification illustrate some embodiments of the invention and, together with the description, serve to explain the objects, advantages, and principles of the invention. In the drawings.

DETAILED DESCRIPTION OF THE PREFERRED EMBODIMENTS

Figure 1:
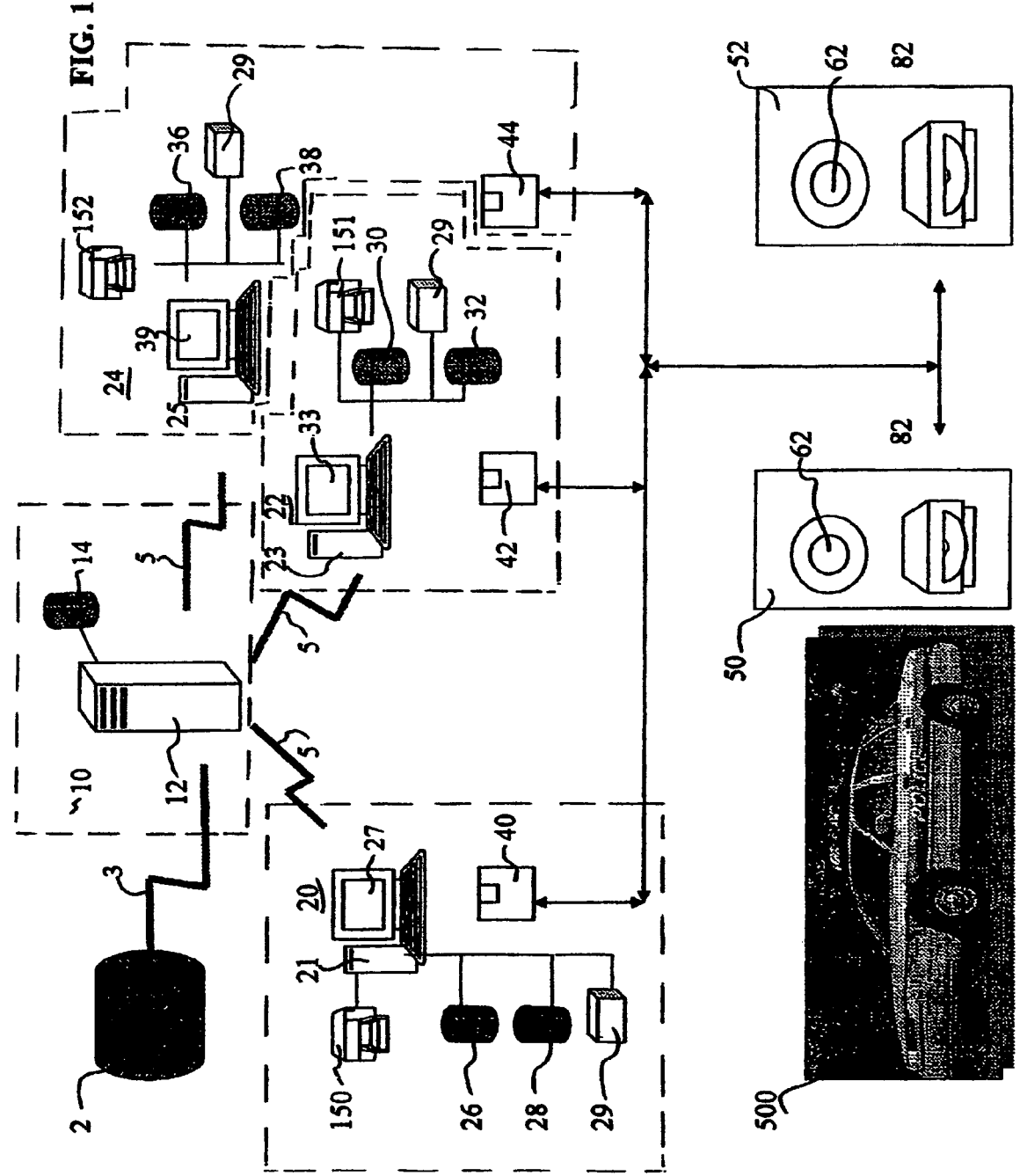
FIG. 1 illustrates a system architecture in accordance with an exemplary embodiment of the present invention.
Figure 2:
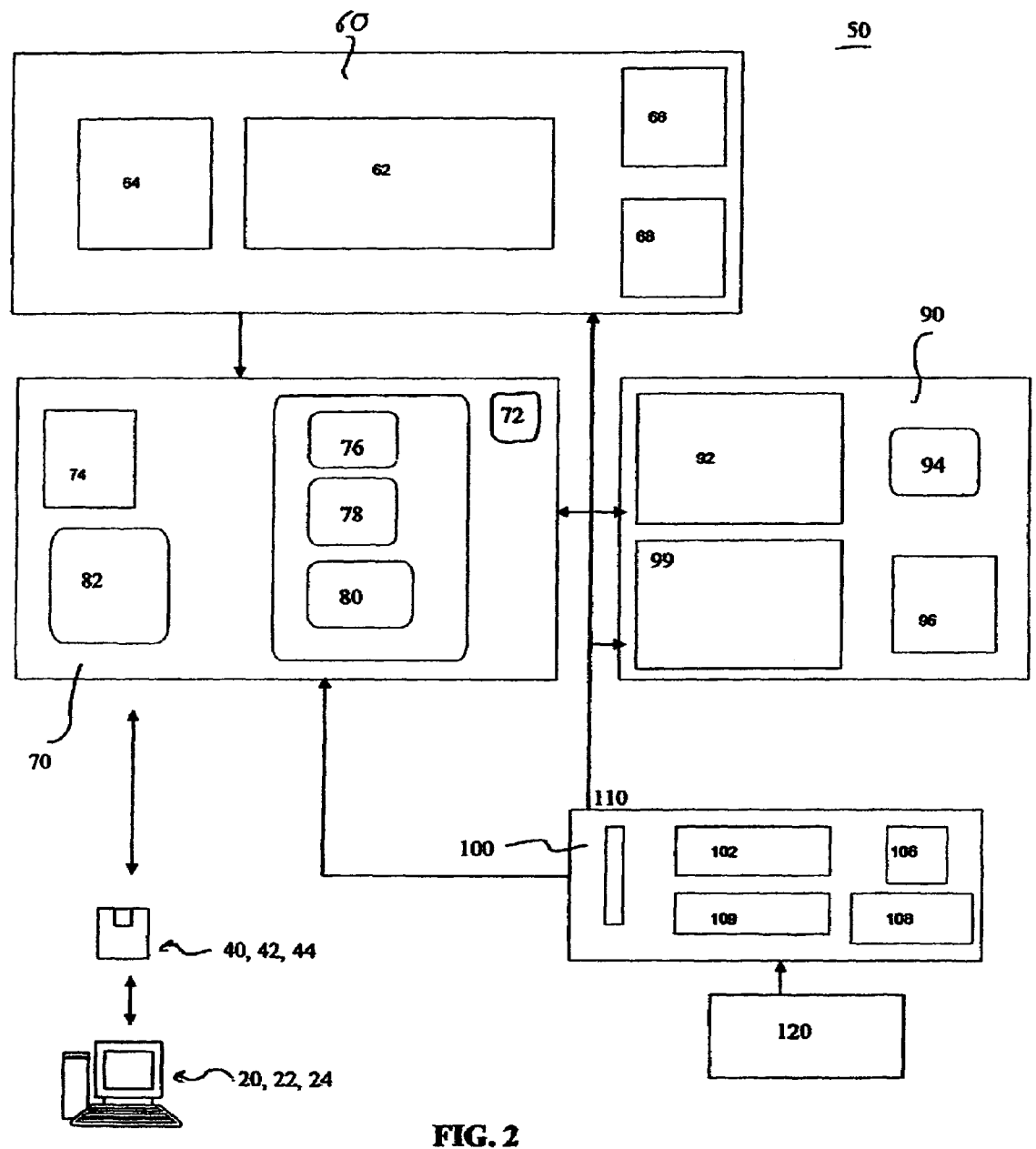
FIG. 2 illustrates a mobile surveillance point in accordance with an exemplary embodiment of the present invention.
Figure 3:
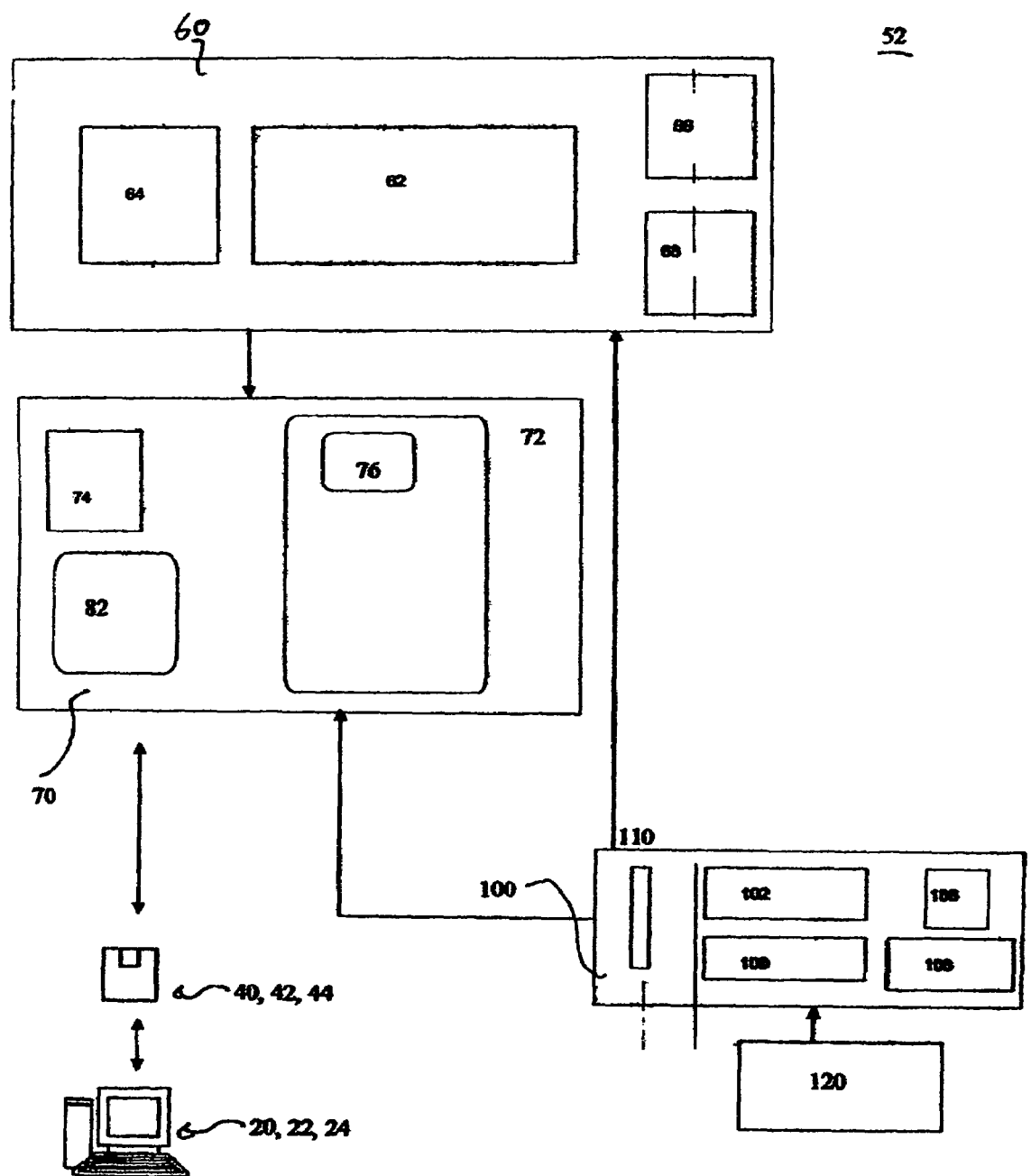
FIG. 3 illustrates a stationary surveillance point in accordance with an exemplary embodiment of the present invention.

A preferred embodiment of the present invention is shown in FIGS. 1–3. FIG. 1 illustrates the system architecture of the present invention. FIGS. 1 and 2 illustrate the system and method used for both professional and non-professional thieves. FIGS. 1 and 3 illustrate the system and method used for locating professional thieves.

One aspect of the present invention is a system and method of conducting surveillance to detect stolen vehicles. The system is run and maintained at a service center 10. System subscribers, such as police departments and other law enforcement agencies, register with the service center 10. Subscribers register with the service center 10 via e-mail, phone, fax, or web site, or any such other method. Subscribers provide information about their jurisdiction, such as geographic location, known criminal activity, when shift changes occur.

The service center 10 has a central server 12. Storage, memory, and processing capabilities needed to operate the server are based on number of subscribers; a minimum ability of Pentium class processor, 20 gigabyte hard drive, 128 mega-byte modem. A secure communications link 3 connects the central server 12 to a database 2 of all vehicles reported stolen in the jurisdiction of interest, such as the United States. The National Crime Information Center, or NCIC, maintains the database 2 of all vehicles reported stolen in the United States. The database 2 includes the make and model of the car, the Vehicle Identification Number, or VIN, the color, license plate number, the reporting agency, and date the vehicle was stolen. Other databases that NCIC maintains that could also be used by this system are: the stolen tag file and felony vehicle file.

The central server 12 includes logic, e.g., software, a processor, and memory, to automatically access the NCIC database 2, and update and store a resident copy of a stolen vehicle database 14. The central server 12 stores instructions to optimize data from the stolen vehicle database 14 by parsing out data specific to each jurisdiction and function of each subscriber. The central server 12 additionally stores instructions for formatting the NCIC data. Data is formatted for several purposes: 1) to reduce false alarms and speed response time by reducing the target set to likely stolen vehicles based on geography and time, 2) to merge data from several sources into a single package for simple distribution to field offices, 3) to clean up the data, address errors, remove recovered vehicles, etc. Other functions performed at the service center are; back-up, analysis tools, security, administration, accounting, and customer service.

Subscribers have a subscriber computer 20, 22, 24. The subscriber computer 20, 22, 24 has a processor and memory (not shown), an I/O, or input/output device 21, 23, 25, a monitor 27, 33, 39, a printer, 150, 151, 152, criminal database 26, 30, 36 and mapping program 28, 32, 38, and spatial analysis software 29 stored in computer memory. In the preferred embodiment, the I/O device 21, 23, 25 is a disc drive capable of reading and writing to a data transfer device 40, 42, 44. In the preferred embodiment, the data transfer device 40, 42, 44 is a compact flashcard. However, it will be appreciated that a variety of portable, hard-wired, or wireless data transfer mediums maybe used. For example, CD ROMs, diskettes, zip drives, and the like, as well as ribbon cables or modems may be used without departing from the scope of the present invention.

As illustrated in FIG. 1, any number of subscribers, up to an arbitrary number N, participate in the system. The subscriber computer 20, 22, 24 connects to the central server 12 via a secure communications link 5. NCIC security protocols will have to be followed to access information with the National Law Enforcement Telecommunications System's (NLETS) secure network as a preferred method. The communication link 5 may be wired or wireless provided that sufficient security precautions, such as encryption, are used with wireless systems. The I/O device 21, 23, 25 connect mobile 50 and stationary 52 surveillance points to the surveillance system of the present invention. The spatial analysis software 29 contains instructions for reading the geographic location of each stationary surveillance point 50, 52, for comparing surveillance data to the regional theft database 26, mapping the location of observed stolen vehicles, and displaying mapped stolen vehicles and their direction of travel. One of ordinary skill in the art of computer programming would be able to write such a software program with detailed software design plan, access to U.S. Government database structure, and support from subject matter expert is required. The spatial analysis software resides on the subscriber computer 20, 22, 24. Additionally, the comparing of the image data to the stolen vehicle database and to the mapping database is done by the multiple software programs.

Referring to FIGS. 1 and 2, a mobile surveillance point 50 is fixed to a police car 500. The mobile surveillance point 50 has camera unit 60 with standard interface, an Ethernet display unit 90, processor unit 70 electrically connected with PCI Buses and a discrete power unit 100. It will be appreciated by one skilled in the art, however, that a variety of electronic connectors may be used without departing from the scope of the present invention.

The camera unit 60 has a camera 62, optics 64, bracket 66, and alignment mechanism 68. The camera unit is mounted on or in the police car 500 with the bracket 66 and positioned with the alignment mechanism 68. In the preferred embodiment, the mounting bracket is a flat swivel with a manual lock and handle for panning, the alignment mechanism 68 includes a discrete encoder that reports out the angle settings to the processor. However, it will be appreciated by one skilled in the art that a wide variety of moveable devices can be used to change the position of the camera 62. The alignment mechanism will be mechanically operated with electrical read-out.

The camera 62 is a high-resolution camera that can clearly process the images of fast-moving vehicles in daytime, nighttime, and inclement weather conditions. Specifically, the camera should operate at temperatures between 0.degree. C. to 50.degree. C. and a non-condensing humidity of 0% to 80%. Other camera specifications are, preferably, power consumption of 250 Watts, the EMC/EMI emissions meet the FCC class B rating of under 6 dB, the I/O capability is 24 channel, TTL compatible with digital I/O per I/O module, the CPU has at least a 233 MHz processor, Interfaces for RS-232, RS-422, Ethernet, NTCIP and TCP/IP, and Image Capture Modules for 4 black and white inputs and real-time JPEG format with digital high-resolution. Commercially available high-resolution cameras that operate within the specifications include the RS-170 manufactured by Ball Aerospace of Boulder, Colo., and the NTSC and PAL cameras manufactured by Sony Corporation. The camera 62 processes digital images of license plates on vehicles captured by the optics 64 as they pass through the optics 64 field of view. Image data is transmitted from the camera 62 to the processor unit 70 through a PCI/ISA bus (not shown).

The optics 64 are attached to the camera 62 and used to enhance the basic capability of the camera 62 to capture images of vehicle license plates which my vary by vendor or users with the goal to work with as many cameras as possible. The optics 64 have at least a high-resolution lens. However, additional lenses, filters, or both may be used in combination in order to change the type and clarity of the images. For example, infrared optics may be used to add vision for night, if desired.

The processor unit 70 of the mobile surveillance point 50 includes an enclosure contained in the police car 500, e.g., in the trunk. The processor unit 70 has a user interface 82 and a processor chip 72. The user interface 82 includes an input/output port for transmitting and receiving data between the mobile surveillance point 50 and the subscriber computer 20, 22, 24. In the preferred embodiment, the user interface 82 includes a disc drive capable of reading and writing to the data transfer device 40, 42, 44. There are separate chips for processing and storing data; a processor chip 72 of the processor unit 70 stores and another chip executes image processing software 76, text comparison software 78, and image display software 80. The preferred embodiment uses an Intel.RTM. Pentium 450 MHz processor with memory However, processors having at least 333 megahertz processor may be used. Although a preferred embodiment includes separate chips for processing and storing data, one skilled in the art would understand that these could be done in a single chip provided that such chip has sufficient processing and memory capacity.

The image processing software 76, text comparison software 78, and image display software 80 of the preferred embodiment are compatible with WindowsNT.RTM. operating platform, although compatibility with other operating platforms, such as Unix is also within the scope of the invention. The image processing software 76 contains instructions for capturing digital images from the camera 62, and manipulating the images. The text comparison software 78 contains instructions for extracting and storing alphanumeric data from captured images, namely license plate numbers. The image display software 80 contains instructions for converting captured images to display images transmitted to the display unit 90, further described below. These software programs 76, 78, 80 are stored in the processor chip 72 memory, or other memory device of the processor unit 70. The image processing software 76 and the text comparison software 78 could be written in a variety of ways known to one skilled in the art of computer programming may build. The image display software 80 is known in the art and may be an off-the-shelf item.

The display unit 90 of the mobile surveillance point 50 is mounted by a bracket 96 in or on the police car 500, preferably in a passenger compartment of the police car 500. The display unit 90 has a display monitor 92, an alarm 94, and a control interface 99. The control interface 99 operates with these controls keyboard for image selection, mechanism to reposition the camera, and an alarm (both audio and visual) to let the policeman know there is a match on a stolen vehicle.

When the system is in scan mode without a detection, the display is of vehicle tag number's currently being scanned, status of system, and images of vehicles in front of camera. The display monitor 92 shows image of vehicle and the list of information stored in stolen vehicle database when a match to a stolen vehicle is identified. The audio alarm frequency is to be determined. The visual alarm will have the screen change color to a red background and the system locking on the picture of the stolen vehicle.

The location of power unit 100 is application specific. Power is drawn from a power source 120. With the mobile surveillance point 50, the battery of the police car 500 serves as the power source 120. A power converter and conditioner 102 regulate the mobile surveillance point 50 at 12 VDC. The power unit 100 has a power switch 106 and a power monitor 108 so that a police officer can turn the mobile surveillance point 50 on or off, and verify it has sufficient power throughout use.

Referring to FIGS. 1 and 3, the stationary surveillance point 52 is illustrated. The stationary surveillance point 52 is not a contained unit. The stationary surveillance point 52 has a camera unit 60, a processor unit 70, a power unit 100, and a power source 120. The camera unit 60, processor unit 70, and power unit 100 are substantially the same as those of the mobile surveillance point 50. The camera, processor, and power units are the same in the mobile and stationary surveillance points. The image display software is excluded from the stationary unit.

The power source 120 for the stationary surveillance point 52 is vehicle power. The stationary surveillance point 52 can be positioned at any vantage point which where license plate images can be clearly captured by the camera 62.

Operation is described in two parts. First, operation using the mobile surveillance point 50 is described. Second, operation using the stationary surveillance point 52 is described.

Referring to FIGS. 1 and 2, the operation of the mobile surveillance point 50 is illustrated. The central server 12 queries the NCIC database 2 via the communications link 3 updates the resident copy 14 prior to any downloads to subscribers. The updating program collects all stolen vehicle information for each particular jurisdiction and stores the updates of each regional theft database 26 in each user profile. At the beginning of a shift, the subscriber connects to the central server 12 via the secure communication link 5 and down loads the update of the regional theft database 26 to the subscriber computer 20, 22, 24.

A copy of the regional theft database 26 is loaded onto the data transfer device 40, 42, 44, for each patrol car 500. An officer takes the data transfer device 40, 42, 44 and inserts it into the user interface 82 of the processor unit 70 of the mobile surveillance point 50. Once inside the police car 500, the officer turns on the mobile surveillance point 50 by pressing the power switch 106. As the officer travels on patrol, the camera unit 60 continuously takes and processes images of vehicle license plates passing through the stream of traffic. Image data is transferred from the camera unit 60 to the processing unit 70. The image processing software 76 separates plate number text from each image. The text comparison software 78 compares each plate number to the regional theft database 26 stored on the data transfer device 40, 42, 44. If a match identifying a stolen vehicle is found, the event is logged with a date/time stamp with digital signal, the image is frozen on screen, all the data in record database is displayed, image is saved, there is an audio alarm, a visual alarm with background color changing to red, and a wait for reset.

Once a stolen vehicle is identified, the image display software 80 creates an overlay. The overlay includes one or more characterizing data fields of the vehicle, e.g., the make and/or model of the car, the Vehicle Identification Number, or VIN, color, license plate number, reporting agency, and date the vehicle was stolen. The image and overlay are shown on the display monitor 92 in the passenger compartment of the police car 500. The officer then may use the image and text information to help identify the stolen vehicle while in pursuit.

Referring to FIGS. 1 and 3, the operation of the stationary surveillance point 52 is illustrated.

At least one, and preferably several, stationary surveillance points 52 are placed in various locations in a jurisdiction. Locations are initially selected by the individual law enforcement agencies that have an understanding of high-density crime areas in their jurisdictions. Locations are selected according to suspected avenues of travel where chop shops are likely to be located and where it is likely that stolen vehicles may travel.

A data transfer device 40, 42, 44 is inserted into the user interface 82 of the processor unit 70 of the stationary surveillance point 52. The camera unit 60 captures images of all license plates traveling through the field of view. The stationary configuration simply records the license plate number for post-processing and images are dropped.

The surveillance data is stored to the data transfer device 40, 42, 44. Once the surveillance data is stored for a period of time, for example and without limitation, 24 hours, the data transfer device 40, 42, 44 is removed, and replaced with another data transfer device 40, 42, 44. The data transfer device 40, 42, 44 storing the surveillance data is taken to the subscriber computer 20, 22, 24. The data transfer device 40, 42, 44 is inserted into the I/O device 21, 23, 25. The spatial analysis software is run. The spatial analysis software is used to compare the surveillance data to the regional theft database 26. Additionally, the spatial analysis software can be programmed to compare surveillance data collected by mobile surveillance points to the regional theft database 26. Any matches identify a stolen vehicle. A regional map is shown on the monitor 27, 33, 39 of the subscriber computer 20, 22, 24, showing the location of the stolen vehicle moving through the surveillance point. A log of the time the vehicle moved through each surveillance point and identifying data for that vehicle are displayed with the map.

A law enforcement officer observes the traffic pattern and determines if the patterns converge on a specific area or smaller location, indicating a chop shop may be in that area or location. If a trend develops, stationary surveillance points 52 can be moved to tighten a circle around the suspected chop shop location. Additionally, patrols can be increased in suspect areas. The surveillance process and trend analysis is repeated until an actual building location of a chop shop is likely or certain. Copies of the map displays and images of the stolen vehicles taken at the stationary surveillance points may be printed on the printer 150, 151, 152 of the subscriber workstation to be used as evidence in legal proceedings.

Although the system and method of the present invention is illustrated with data transfers occurring over a line-based communications link, it will be appreciated that some or all of the communications links may be wireless. In the wireless embodiment, wireless receivers and transponders may be added to, for example, the central server 12, subscriber computer 20, 22, 24, and mobile 50 and stationary 52 surveillance points to transmit and receive data. With the wireless embodiment, updates can occur more frequently. Further, this embodiment would not require a data transfer device 40, 42, 44 for transferring data.

Alternative embodiments of the present invention that have been contemplated include at least for the subscriber computer and server functions being combined at one computer so that a database can be loaded on the move.

Although the system and method of the present invention is illustrated in the context of surveillance of stolen vehicles, it will be appreciate that the system and method applies to surveillance of vehicles generally. This system and method can be used for other surveillance reasons, such as detecting the movement of terrorists or other types of thieves. For such applications, the stolen vehicle database 14 is replaced by another type of database, such as a felony vehicle database, and amber Alert database for abducted children, a recent "hot list" of vehicles involved in hit and run accidents or other crimes.

Although the preferred embodiment illustrates gathering stolen vehicle data from the NCIC database, it will be appreciated that the information may come from a variety of data and database sources. For example, one or more jurisdictional databases may be created and stored on the central server without departing from the scope of the present invention. In such alternatives, the logic for optimizing data from stolen vehicle databases 14 would simply be programmed to access the one or more jurisdictional databases may be created and stored on the central server.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of aforementioned documents is incorporated by reference herein.

What is claimed is:

1. A method of identifying a region associated with a pattern of activity of interest using a plurality of electronic vehicle surveillance points comprising the steps of:
    capturing images of license plates of a plurality of different vehicles at two or more of said plurality of surveillance points;
    recording data associated with each captured image;
    extracting alphanumeric license plate data from said captured images;
    comparing said license plate data to a database of license plates to identify a plurality of different vehicles of interest; and
    performing spatial analysis on said plurality of different vehicles of interest and recorded data associated with each of said different vehicles of interest to identify region associated with a pattern of activity of interest involving said plurality of different vehicles of interest.

2. A method of identifying a region associated with a pattern of activity of interest according to claim 1, further comprising the steps of:
    repositioning at least one of said surveillance points closer to said region associated with said pattern of activity;
    capturing images of a plurality of license plates of different vehicles at said at least one repositioned surveillance point and at least one other of said surveillance points;
    recording data associated with each captured image;
    extracting alphanumeric license plate data from said captured images;
    comparing said license plate data to a database of license plates to identify a second plurality of vehicles of interest; and
    performing spatial analysis on said second plurality of vehicles of interest and recorded data associated with said captured images of license plates of said second plurality of vehicles of interest to identify a second region associated with said pattern of activity of interest, said second region being smaller than said first region.

3. A method of identifying a region associated with a pattern of activity of interest according to claim 1, wherein said activity of interest comprises operation of a chop shop.

4. A method of identifying a region associated with a pattern of activity of interest according to claim 1, wherein said license plate matches of interest comprise license plates associated with stolen vehicles.

5. A method of identifying a region associated with a pattern of activity of interest according to claim 1, wherein at least of said plurality of surveillance points comprises a mobile surveillance point.

6. A method of identifying a region associated with a pattern of activity of interest according to claim 5, further comprising the step of:
    displaying data associated with a license plate match of interest in said mobile surveillance point.

7. A method of identifying a region associated with a pattern of activity of interest according to claim 1, wherein recorded data comprises a time associated with each captured image.

8. A method of identifying a region associated with a pattern of activity of interest according to claim 1, wherein said recorded data comprises a direction of travel associated with each captured image.

* * * * *